(No Model.)

J. P. LIVERMORE.
Microphones.

No. 232,734. Patented Sept. 28, 1880.

Witnesses.
Arthur Reynolds.
V. D. Dearborn.

Inventor.
Jos. P. Livermore.
by Crosby Gregory
Attys.

UNITED STATES PATENT OFFICE.

JOSEPH P. LIVERMORE, OF CAMBRIDGE, MASSACHUSETTS, ASSIGNOR TO AMERICAN BELL TELEPHONE COMPANY.

MICROPHONE.

SPECIFICATION forming part of Letters Patent No. 232,734, dated September 28, 1880.

Application filed July 6, 1880. (No model.)

*To all whom it may concern:*

Be it known that I, JOSEPH P. LIVERMORE, of Cambridge, county of Middlesex, State of Massachusetts, have invented an Improvement in Microphones, of which the following description, in connection with the accompanying drawings, is a specification.

My invention relates to a microphone or battery-transmitter, and has for its object to give delicacy in the adjustment of the pressure upon the contact-points or electrodes, and to transmit the sound-vibrations to the said contact-points or electrodes in the most effective manner.

Usually one electrode or terminal of an electric circuit has been vibrated in contact with a second electrode by the impact of sound-waves upon a diaphragm, the said second electrode being weighted to prevent it from following the movement of the said vibrating point.

This invention consists in the combination, with the usual diaphragm, of a flexible vibrator connected at one end with the said diaphragm and extended longitudinally therefrom and arranged to press laterally against the contact-point or electrode, which, by this construction, may be held rigidly in the frame-work, instead of resisting the vibrations by inertia, as in the case of the usual weighted electrodes. The said flexible vibrator may itself be of conductive material connected with one pole of the battery, forming one electrode thereof, or it may rest against and press together two electrodes, one of which is rigid and the other free to follow the vibratory movement of the said vibrator. The vibration of the diaphragm causes variation in longitudinal strain on the flexible vibrator connected therewith, and such variation in strain causes corresponding variation in lateral pressure against the electrodes. It is possible, by varying the initial longitudinal strain on the said vibrator connected with the diaphragm, to adjust its lateral pressure against the electrodes with extreme delicacy, and the variations in pressure, owing to the vibratory movement, may be adjusted by varying the amount of lateral deviation of the vibrator caused by the electrode in contact therewith from the position the said vibrator would assume if left free and not touched by the said electrode.

Figure 1:
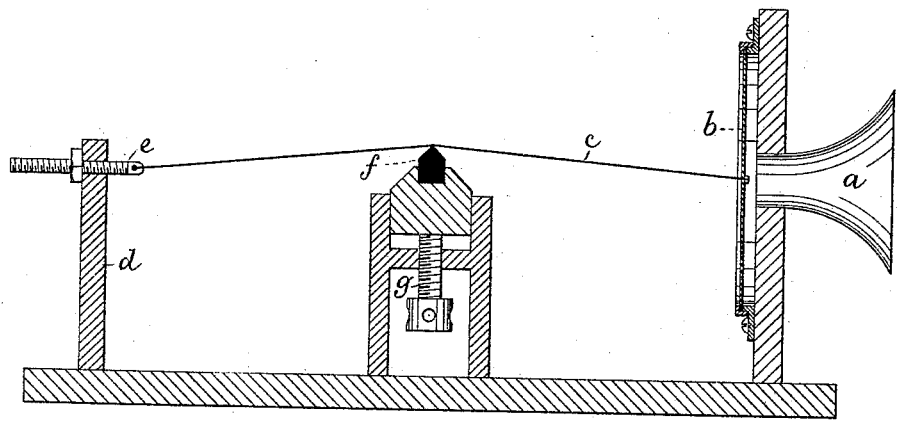
Figure 2:
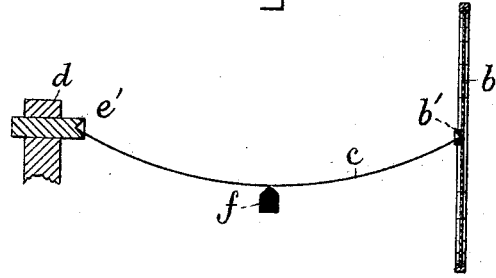

Figure 1 is a longitudinal section of a microphone embodying my invention, the vibrator connected with the diaphragm being shown in a state of tension; Fig. 2, a modification thereof, showing the vibrator in a state of compression.

The mouth-piece $a$, sound-chamber, and diaphragm $b$ may be of any usual construction.

Connected with the center of the diaphragm, and extended longitudinally therefrom, is a flexible vibrator, $c$, supported at its other end by the frame-work $d$. The said vibrator $c$ is shown as a string or wire connected with the adjusting-screw $e$ in the frame $d$.

In Fig. 2 the vibrator $c$ is shown as a spring inserted between a socket, $b'$, on the diaphragm $b$, and a second socket, $e'$, supported in the frame $d$, the said sockets $b'$ $e'$ being sufficiently near together to cause the said spring to deviate from a straight line. In either case the vibrator $c$ bears against a suitable electrode, $f'$, (shown as of carbon,) at a point between its ends. Such an agreement admits of extreme delicacy in the adjustment of the normal pressure of the electrodes, and the vibrations of the diaphragm $b$ can be closed to give greater or less variation in pressure of the said electrode without at all confusing the said vibrations in changing their relative intensity.

The electrode $f$ may be adjusted in its position by the screw $g$, and by this adjustment the effect of the vibrations of the vibrator $c$ will be regulated, while the normal or initial pressure will be regulated by the longitudinal strain, the said strain being tensile in the device shown in Fig. 2, and adjusted by the screw $e$, while in the modification shown in Fig. 2 the strain is compressive and adjusted by longitudinal movement of the socket-piece $e'$ in the frame $d$.

It will be readily understood that the less the vibrator $c$ is caused to deviate from a straight line the greater will be the amplitude of its lateral movement in proportion to the extent of the vibrations of the diaphragm $b$; while the greater the deviation the less will be the amplitude of vibration and consequent variation in pressure of the electrodes.

It is obvious that a second movable electrode may be interposed between the rigid one $f$ and the vibrator $c$, which need not then be of conductive material, and other obvious modifications may be made without departing from my invention.

A transmitter constructed on this plan will not "break," and gives clear and distinct articulation.

I do not broadly claim a vibrator extended longitudinally from and vibrated by a diaphragm, as I am aware that it has been previously employed in a magneto-telephone.

I claim—

1. In a microphone, the diaphragm and a rigidly-supported electrode, combined with a flexible vibrator connected with and extended longitudinally from the said diaphragm, and arranged to bear laterally upon the said electrode to cause variations in the pressure on the said electrode proportional to the vibration of the diaphragm, substantially as and for the purpose described.

2. In a microphone, the diaphragm and electrodes, combined with a flexible vibrator extended longitudinally from the said diaphragm, and resting at an intermediate point in contact with the said electrode, and an adjusting device to adjust the normal longitudinal strain on the said vibrator, substantially as described.

3. In a microphone, the diaphragm and a flexible vibrator extended longitudinally therefrom, combined with an electrode and an adjusting device therefor, to adjust its position relative to the supporting-points of the said vibrator, as and for the purpose set forth.

In testimony whereof I have signed my name to this specification in the presence of two subscribing witnesses.

JOSEPH P. LIVERMORE.

Witnesses:
  G. W. GREGORY,
  L. F. CONNOR.